(No Model.)
F. H. PAGE.
CAN RECEPTACLE.
No. 492,101.   Patented Feb. 21, 1893.
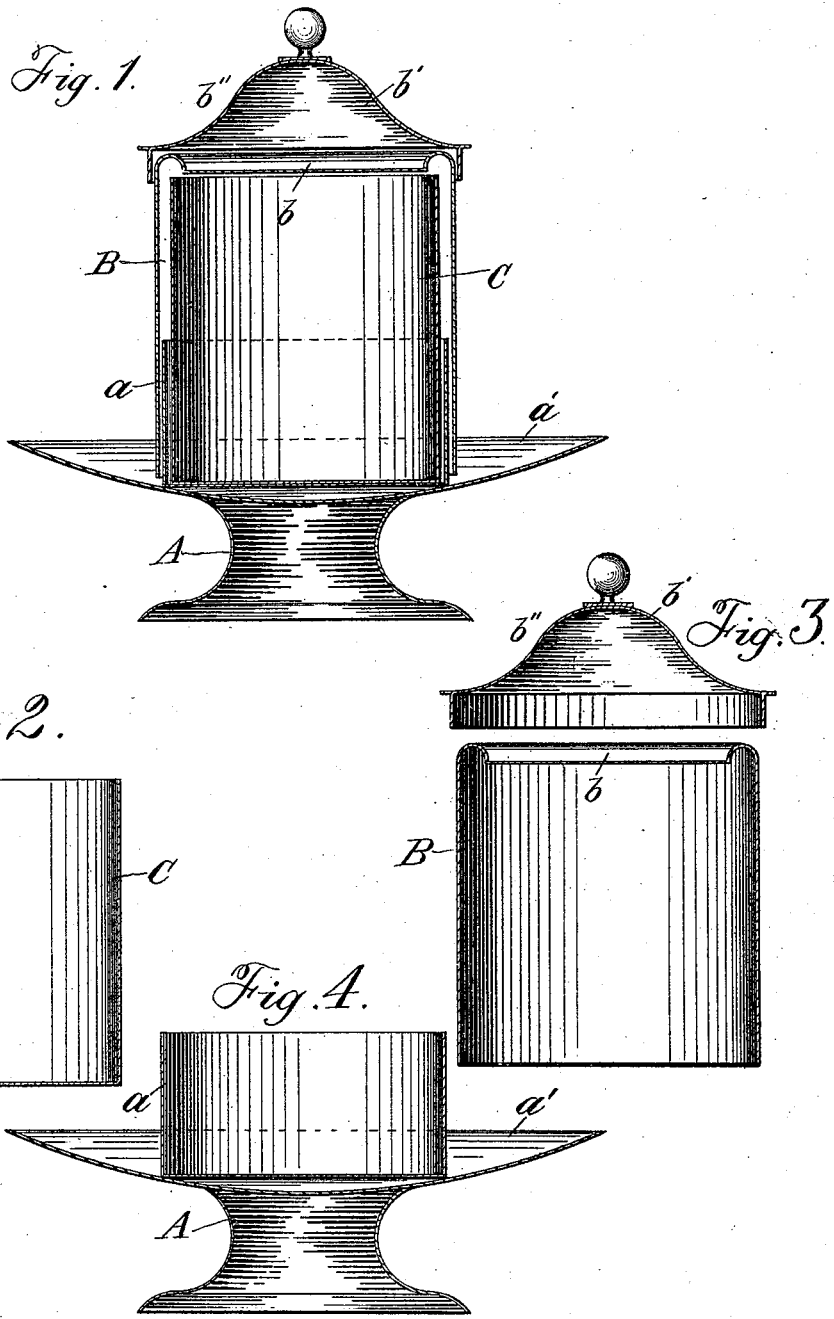
Witnesses:
P. H. Moran.
A. S. Bucknam
Inventor:
Fred H. Page

UNITED STATES PATENT OFFICE.

FRED H. PAGE, OF NEW YORK, N. Y.

CAN-RECEPTACLE.

SPECIFICATION forming part of Letters Patent No. 492,101, dated February 21, 1893.

Application filed June 4, 1891. Serial No. 395,166. (No model.)

*To all whom it may concern:*

Be it known that I, FRED H. PAGE, a citizen of the United States, residing in the city, county, and State of New York, have invented a new and useful Receptacle for Cans Designed to Contain Condensed Milk or other Articles; and I hereby declare that the following is a full, clear, and exact description of the same, reference being had to the drawings which accompany and form part of this specification.

The object of my improvement is to provide a receptacle capable of being made as ornamental as may be desired and adapted to receive—but at the same time to conceal—an ordinary can or vessel containing condensed milk or other article of food, so that the milk or other article may be placed and used on the table while the unsightly appearance of the can or vessel in which it is served will be completely hidden.

In the drawings Figure 1 is a vertical transverse section of a receptacle which embodies my invention; Fig. 2 is a similar section of a tin can of ordinary construction which the receptacle shown in the figures is adapted to contain; Fig. 3 is a vertical transverse section of the case and cover of the receptacle, and Fig. 4 is a similar section of the base portion of the latter.

To enable others to put my improvement into use I will proceed to describe it in detail.

A is the base of the receptacle. Into this the can C is placed and is held in position by the rim $a$.

$a'$ is a wide hollowed flange which is intended to serve as a saucer to catch drippings, receive a spoon, and also, when appropriately ornamented, to increase the attractiveness of the utensil for the table.

B is an external shell or case which incloses the can C and fits closely over the rim $a$ of the base A. This case has its upper portion $b$ formed into an inwardly-projecting lip which is adapted to cover entirely the upper edge of the can C, so that when the case is in place the body and upper part of the can will be completely concealed from view.

$b$ is a cover which may, when preferred, be provided with wire netting $b''$ for the purpose of admitting air to the contents of the can or other vessel.

In making use of my invention, it is merely necessary to set the can or other vessel within the rim $a$ of the base A, then slip the outer case B over the can C and over the rim $a$, and finally place the cover $b'$ in position as shown in Fig. 1. The unsightliness of the can will thus be completely hidden, and as the exterior of the receptacle can easily be handsomely ornamented it will constitute an additional attraction for the table.

I do not limit myself to the precise shapes, nor to any particular dimensions—such as heights or diameters—of any of the parts herein described and shown, as any of these may be varied as desired so long as the combination specified in the claim is substantially adhered to.

Having thus described my improvement, what I claim, and desire to secure by Letters Patent, is—

A receptacle for cans or other vessels, consisting of the base A provided with the rim $a$ for the reception of the can or vessel and with the saucer flange $a'$, the external case B fitting over the said rim and having its upper portion turned inward as represented, and the cover $b$ for the case B, the whole constructed and combined substantially as described.

FRED H. PAGE.

Witnesses:
F. G. HENRY,
JOS. K. MILLER.